March 24, 1970
J. GUELPH
3,501,803
BLOW CORE WITH CLOSABLE BLOW PORT
FOR PLASTIC MOLDING APPARATUS
Filed Feb. 5, 1968
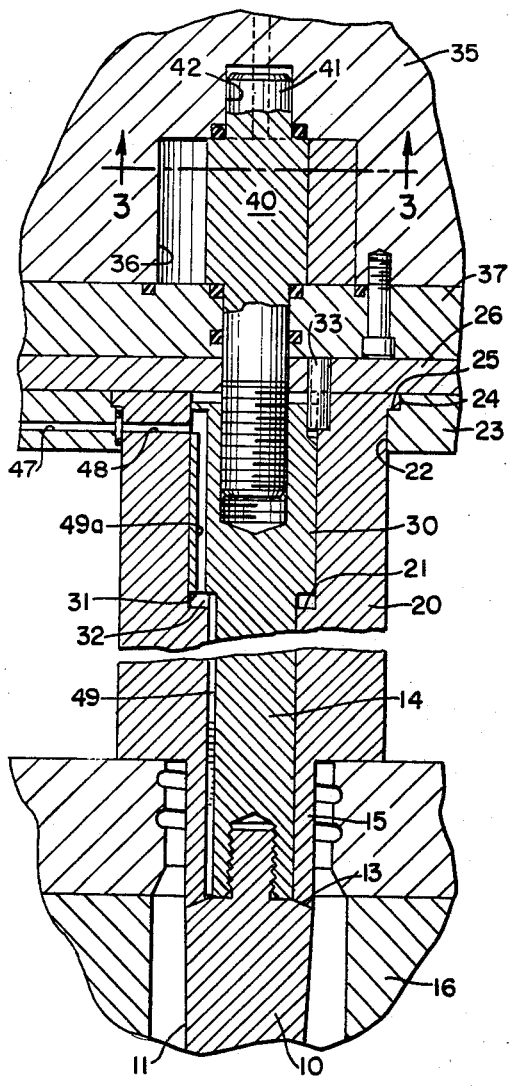
FIG. 1
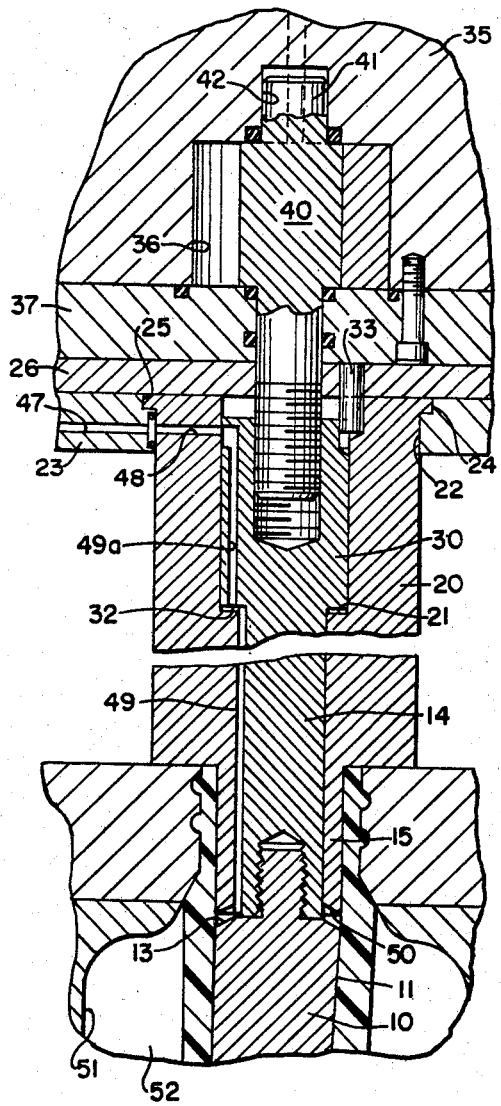
FIG. 2
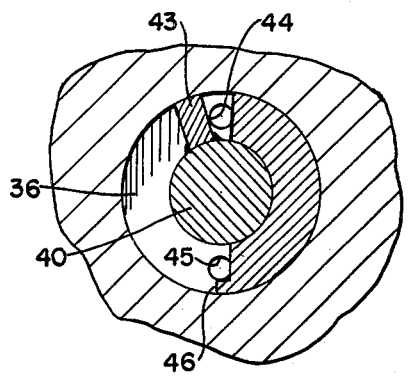
FIG. 3
INVENTOR
JOHN GUELPH
BY 
ATTORNEY

United States Patent Office 3,501,803
Patented Mar. 24, 1970

3,501,803
BLOW CORE WITH CLOSABLE BLOW PORT FOR PLASTIC MOLDING APPARATUS
John Guelph, Paterson, N.J., assignor to Emery I. Valyi, Riverdale, N.Y.
Filed Feb. 5, 1968, Ser. No. 703,193
Int. Cl. B29c *17/07;* B29d *23/03*
U.S. Cl. 18—5                                      8 Claims

ABSTRACT OF THE DISCLOSURE

A blow core for molding and blowing a parison having a sleeve forming a continuation of the blow core surface. The blow core is formed with a stem slidable in the sleeve to open and close the blow ports. A rotatable threaded shaft actuated by fluid pressure registers with threads in the stem for advancing or retracting the blow core so as to open or close the ports.

---

This invention relates to apparatus for molding and blowing organic plastic material and more particularly to a blow core having closable blow ports for use in molding apparatus including a parison mold and a blow mold.

An object is to provide a blow core of the above type having improved mechanism for closing or opening the blow ports.

Another object is to provide novel and improved means for maintaining the blow ports closed during the parison molding step and for opening the ports for blowing the parison into the blow mold cavity.

Various other objects and advantages will be apparent as the nature of the invention is more fully disclosed.

In accordance with the present invention, the blow core is formed with ports in its side surface in a zone remote from the end of the core and is slidable in a sleeve. When the blow core is retracted, the sleeve closes the ports and forms a continuation of the side surface of the blow core. When the blow core is advanced in the sleeve, the ports are exposed for blowing the parison into the blow mold cavity. A rotary, threaded shaft, activated by fluid pressure, is provided for advancing and retracting the blow core.

The nature of the invention will be better understood from the following description, taken in connection with the accompanying drawing in which a specific embodiment has been set forth for purposes of illustration.

In the drawing:

FIG. 1 is a longitudnal section through a blow core embodying the invention, showing the blow ports in closed position for molding the parison;

FIG. 2 is a similar section showing the blow ports in open position for blowing the parison into the blow mold cavity; and FIG. 3 is a transverse section taken on the line 3—3 of FIG. 1 showing the fluid actuated, rotatable shaft by which the blow core is actuated.

Referring to the drawing more in detail, the invention is shown as embodied in a blow core 10 having a side cylindrical surface 11 conforming to the inside of the parison wall and an end surface (not shown) conforming to the inside of the closed end wall of the parison. The side wall 11 terminates in a shoulder 13 beyond which the blow core stem 14 extends. The stem 14 is slidable within a sleeve 15. When retracted, the shoulder 13 abuts the end of the sleeve 15. In this position, the sleeve 15 forms a continuation of the cylindrical surface 11 of the blow core. The blow core and sleeve are insertable in a parison mold, indicated at 16, and are adapted to form, with the parison mold, a cavity into which the plastic may be injected from an injection passage for forming the parison.

At a point above the parison mold 16, the sleeve 15 is shouldered outwardly to form a cylindrical wall 20 of greater diameter than the portion 15 and an annular wall 21. The wall 20 extends through a bore 22 in a plate 23 and has an outwardly extending flange 24 which seats in an annular recess 25 in the plate 23. A second plate 26 is disposed over the plate 23 to clamp the flange 24 in place.

A cylinder 30, carried by the stem 14, slides within the sleeve cylinder 20 and has an end wall 31 which is spaced from the annular wall 21 of the sleeve to form an annular chamber 32. A key 33 is disposed between the cylinders 20 and 30 to prevent rotation of the cylinder 30 while permitting relative sliding movement between the two cylinders.

A block 35, which may be attached to or form a part of a cross head by which the blow core is shifted between the parison forming and the blowing positions, is formed with a recess constituting an annular chamber 36 which is closed by a third plate 37.

A shaft 40 carries at its upper end a hub 41 journalled in a recess 42 in the block 35 and extends downwardly through the annular chamber 36 and the plates 37, 23 and 26 into the cylinder 30. The shaft 40 and the inner wall of the cylinder 30 are threaded so that rotation of the shaft causes the cylinder 30 and the blow core 10 to be advanced or retracted in the sleeve 15.

A vane 43 is attached to the shaft 40 to rotate through a predetermined angle in the annular chamber 36. Fluid pressure is supplied to the chamber 36 on opposite sides of the vane 43 through passages 44 and 45 respectively in an abutment 46. The shoulder 13 and sleeve 15 are arranged so that there is a clearance between the vane 43 and the passage 44 when the blow core is fully retracted, so that the shoulder 13 contacts the end of the sleeve 15. In the other direction, the vane 43 may stop against the abutment 46 to limit the advance of the blow core while leaving passage 45 open for a return stroke of the vane 43.

Fluid pressure is supplied to the annular chamber 32 through a passage 47 in the plate 23 and a passage 48 in the annular wall 21. The stem 14 is formed with a longitudinal channel 49 extending from the chamber 32 to the shoulder 13. Another passage 49a in cylinder 30 connects the passage 48 with chamber 32 to complete a fluid passage to a port 50 to be opened or closed by the sleeve 15 as the blow core is advanced or retracted.

When the blow core 10 is inserted in the parison mold 16, the shaft 40 is actuated to retract the blow core and close the port 50, as shown in FIG. 1. The parison can then be molded without any possibility of the plastic entering or clogging the port 50. When the blow core with the parison thereon is inserted into the blow mold 51, as shown in FIG. 2, the shaft is actuated in a direction to open the port 50 for the blowing of the parison into the blow mold cavity 52.

Since the blow core is actuated by a threaded shaft it can be held retracted by a considerable force and is mechanically locked in place until the shaft 40 is rotated by the action of fluid pressure against the vane 43 in the opening direction. Hence, any opening tendency is opposed by the threaded shaft and not by fluid pressure alone. Also, a considerable closing force is obtained with a minimum of fluid pressure.

What is claimed is:

1. Molding apparatus comprising a blow core having a fluid passage terminating in a port, relatively shiftable components to open and close said port, a rotatable member having means responsive to the rotation thereof for opening said port and means for turning said rotatable member.

2. Molding apparatus as set forth in claim 1 wherein said rotatable member is in threaded engagement with one of said components.

3. Molding apparatus as set forth in claim 1 in which fluid pressure means is provided to turn said rotatable member.

4. Molding apparatus as set forth in claim 1 including means preventing rotational movement of said components, whereby separation of said components is effected axially by the rotation of said rotatable member.

5. Molding apparatus as set forth in claim 3 in which said fluid pressure means includes an annular fluid chamber and a vane rotating in said chamber.

6. Molding apparatus as set forth in claim 5 in which said annular chamber includes an abutment to limit the angle of rotation of said vane.

7. Molding apparatus as set forth in claim 6 in which said abutment includes fluid passages to supply fluid pressure selectively on opposite sides of said vane.

8. Molding apparatus as set forth in claim 7 in which said abutment forms a stop to limit the opening of said port and clearance is provided between said vane and said abutment when the said port is closed.

References Cited

UNITED STATES PATENTS

| | | |
|---|---|---|
| 2,789,313 | 4/1957 | Knowles. |
| 3,029,468 | 4/1962 | Valyi. |
| 3,301,928 | 1/1967 | Plymale. |
| 3,327,035 | 6/1967 | Parfrey. |
| 3,387,324 | 6/1968 | Valyi. |

J. HOWARD FLINT, JR., Primary Examiner

M. O. SUTTON, Assistant Examiner